(12) United States Patent
Morsillo et al.

(10) Patent No.: US 8,666,892 B2
(45) Date of Patent: Mar. 4, 2014

(54) ELECTRONIC PAYMENT PROCESSING SYSTEM

(75) Inventors: Leon N. Morsillo, Pennsburg, PA (US); Terry H. Zeigler, Quakertown, PA (US)

(73) Assignee: Datacap Systems, Inc., Chalfont, PA (US)

( * ) Notice: Subject to any disclaimer, the term of this patent is extended or adjusted under 35 U.S.C. 154(b) by 74 days.

(21) Appl. No.: 11/943,025

(22) Filed: Nov. 20, 2007

(65) Prior Publication Data

US 2008/0147550 A1    Jun. 19, 2008

Related U.S. Application Data

(60) Provisional application No. 60/870,642, filed on Dec. 19, 2006.

(51) Int. Cl.
*G06Q 40/00* (2012.01)

(52) U.S. Cl.
USPC .............................. 705/44; 705/40

(58) Field of Classification Search
USPC ......................................................... 705/44
See application file for complete search history.

(56) References Cited

U.S. PATENT DOCUMENTS

| | | | | |
|---|---|---|---|---|
| 5,812,668 | A * | 9/1998 | Weber | 705/79 |
| 2002/0072974 | A1* | 6/2002 | Pugliese et al. | 705/14 |
| 2003/0026404 | A1* | 2/2003 | Joyce et al. | 379/144.01 |
| 2003/0182227 | A1* | 9/2003 | Guzman | 705/39 |
| 2005/0049978 | A1* | 3/2005 | Kleen | 705/72 |
| 2007/0205275 | A1* | 9/2007 | Nicola et al. | 235/383 |

OTHER PUBLICATIONS

Kim J; Service providing system comprises storage unit for storing user data which includes identification number of universal serial bus device, where controller proceeds control service; Sep. 9, 2009; Thomson Reuters; 13/3,K/6 (Item 6 from file: 350).*

Claeys L A H; Method for providing service to access end device e.g. personal computer, involves obtaining information identifying end device and specific profile stored in mobile device based on interaction between end device and mobile device; Jun. 10, 2009; Thomson Reuters; 13/3,K/11 (Item 11 from file: 350).*

Anzai J; Portable mobile telephone for motor vehicle, has control unit that controls wireless communiction unit to transmit held identification with respect to service terminal device related to key terminal device; Sep. 28, 2006; Thomson Reuters; 13/3,K/15 (Item 15 from file: 350).*

Paymentech Product Education Services, Chapter 4 Download Procedures, Hypercom ICE, Jan. 2002, pp. 4-1-4-7.

(Continued)

*Primary Examiner* — Ella Colbert
*Assistant Examiner* — Michael Cranford
(74) *Attorney, Agent, or Firm* — Douglas J. Ryder; Ryder, Lu, Mazzeo & Konieczny, LLC

(57) ABSTRACT

In general, in one aspect, an electronic payment transaction can be processed at a merchant location without the need for configuring the equipment used to include parameters related to a merchant account (merchant profile). The electronic payment transactions processed from the merchant location simply include a unique identification for the equipment. A processing switch upstream maintains a correlation between the unique identifiers and the merchant profiles and retrieves the appropriate merchant profile for the unique identification and utilizes the merchant profile to process the electronic payment transactions.

23 Claims, 12 Drawing Sheets

(56) References Cited

OTHER PUBLICATIONS

Hypercom, Chapter 3 Terminal Setup Procedures, T7 Plus Hardware and Installation Manual, Apr. 30, 2002, pp. 3-26-3-28, Revision A.
Verifone, Chapter 3 Downloading and Chapter 7 Entering Transaction Parameters, Tranz 330 Reference Manual, date unknown, pp. 3-1-3-7 and 7-1-7-9, Revision 3.01.
Verifone, TCLoad Reference Manual, date unknown, pp. 1-1-4-9, Revision 1.0.
Verifone, Chapter 5 Programming the FDR XL Terminal for Use and Appendix D ZonTalk Download Parameters, Zon Jr. XL/XL 300 FDR XL Enhancement Reference Manual, date unknown, pp. 5-1-5-5 and D-1-D-5, Revision 1.0.
Datacap Systems, Payment Solutions Overview, Jul. 8, 2009, 1 page.
Datacap Systems, IPTran, Aug. 26, 2009, 2 pages.
Datacap Systems, DialTran, Jan. 2, 2008, 2 pages.
Datacap Systems, TwinTran, Sep. 16, 2008, 2 pages.
Datacap Systems, What is AutoLoad, Jul. 9, 2009, 1 page.
Datacap Systems, AutoLoad, Aug. 26, 2009, 2 pages.
Datacap Systems, PSCS, Aug. 26, 2009, 2 pages.
Datacap Systems, DataTran Initiated Dial-In Download, date unknown, 2 pages.
Datacap Systems, SPS (ADS) Host merchant profile worksheet, date unknown, 2 pages.

\* cited by examiner

ELECTRONIC PAYMENT PROCESSING SYSTEM

PRIORITY

This application claims the priority under 35 USC §119 of Provisional Application 60/870,642 entitled "Method to deploy hardware and software payment systems" filed on Dec. 19, 2006 and having Leon N. Morsillo and Terry H. Zeigler as inventors. Application 60/870,642 is herein incorporated by reference in its entirety but is not prior art.

BACKGROUND

Today most merchants, whether brick and mortar or Internet, accept electronic payments (e.g., credit cards, debit cards, gift cards) as tender for transactions. Electronic payments may also be accepted by vending machines, kiosks, automated tellers or other systems where a human is not needed to conduct the transaction or process an electronic payment as tender for the transaction.

FIG. 1 illustrates an example architecture used to process electronic payments for merchant transactions. The architecture includes a merchant system 110, a payment handler 120, a communication network 130, and a payment processing system 140. The merchant system 110 may be a hardware system (e.g., electronic cash register (ECR), point of sale (POS)) or may be a software system (e.g., POS). The merchant system 110 may track items purchased and generate an invoice/sales receipt based on the cost of those items purchased and any taxes and/or discounts applied. The merchant system 110 may include an interface for gathering data about the transactions. The interface may include, but is not limited to, a scanner to scan codes associated with items (e.g., UPC codes), a keyboard to enter data associated with items, or a touch screen to select items. The merchant system 110 may be tied to other systems (e.g., inventory system, management system). The merchant system 110 may also include an interface to gather electronic payment information (e.g., card number). The interface may include, but is not limited to, a card reader (swiper), a scanner, a keyboard, or a touch screen.

The payment handler 120 may process the electronic payment information so that it can be communicated to the payment processing center 140 along with the transaction data (payment amount). The payment handler 120 may be separate from the merchant system 110, interfaced to the merchant system 110 or integrated into the merchant system 110. The payment handler 120 may receive the transaction data (payment amount) from the merchant system 110 or the payment amount may be entered into payment handler 120. The payment handler 120 may receive the electronic payment information from the merchant system 110, from an electronic payment information device (not illustrated) connected to the payment handler 120, or the electronic payment information may be entered into payment handler 120. The payment handler 120 may include an interface to gather electronic payment information. The interface may include, but is not limited to, a card reader (swiper), a scanner, a keyboard, or a touch screen. The payment handler 120 may be configured to include information related to a merchant-payment processor relationship (merchant account), including identification information for the merchant in the payment processing system 140, and the configuration details may be utilized to communicate with the payment processing center 140.

The communication network 130 provides communications between the payment handler 120 and the payment processing system 140. The communication network 130 may be a phone network, the Internet and/or a wireless network.

The payment processing system 140 receives and processes electronic payment transactions from the payment handler 120. The electronic payment transactions received may include information related to the transaction (e.g., payment amount), information related to the electronic payment used (e.g., credit card number), and information related to the merchant (e.g., merchant identifying information). The payment processing system 140 may determine if the transaction received is authorized for the merchant (e.g., does merchant accept that type of credit card) and if the electronic payment can be processed (e.g., is transaction amount within card limit of the purchaser). Once the transaction is approved, the payment processing system 140 may process payment from the card company to the merchant based on identification of the merchant included in the electronic payment transaction.

FIGS. 2A-2C illustrate several example merchant system-payment handler architectures. FIG. 2A illustrates an architecture where the merchant system 110 and the payment handler 120 are separate devices that are not interfaced together or communicating directly with one another. The merchant system 110 does not communicate merchant transaction data (e.g., payment amount) to the payment handler 120 so the transaction data (payment amount) needs to be entered (manually) into the payment handler 120. Additionally, cross referencing may be required between the merchant transactions processed in the merchant system 110 and the electronic payment transactions processed in the payment handler 120. The payment handler 120 may include an electronic payment interface (e.g., card reader, scanner, keyboard) for accepting data related to the consumer and their electronic payment (e.g., credit card number). The payment handler 120 may include a user interface (e.g., keyboard) for entering the merchant transaction data. The payment handler 120 is basically a data terminal used to enter merchant transaction data and electronic payment transaction data and communicate the transaction to the payment processing system 140.

FIG. 2B illustrates an architecture where the merchant system 110 and the payment handler 120 are separate devices that are interfaced together and communicate therebetween. The merchant system 110 provides the merchant transaction data to the payment handler 120. The merchant system 110 may include an electronic payment interface (e.g., card reader, scanner, keyboard) for accepting data related to the consumer and their electronic payment (e.g., credit card number) and may provide the electronic payment information to the payment handler 120. The payment handler 120 may process the merchant transaction information and the electronic payment information and forward to the payment processing system 140.

FIG. 2C illustrates an architecture where the merchant system 110 and the payment handler 120 are integrated into a single device. The payment handler 120 may be software, hardware or firmware within the merchant system 110. The payment handler 120 may receive the merchant transaction data from the merchant system 110. The merchant system 110 may include an electronic payment interface for accepting data related to the consumer and their electronic payment. The electronic payment data may be provided to the payment handler 120. The payment handler 120 may process the merchant transaction data and the electronic payment information and forward to the payment processing system 140.

When a merchant and a payment processor execute an agreement for the payment processor to handle electronic payment transactions for the merchant (establish a merchant account) the payment processor creates a profile for the merchant (processor side merchant profile) that identifies the merchant and defines parameters associated with their account. The processor side merchant profile may define the types of transactions authorized and include various identifications (e.g., merchant ID, payment processor ID, merchant account ID). The processor side merchant profile may be stored in the payment processing system 140. The payment processing system 140 may utilize the processor side merchant profile to identify incoming transactions with the merchant, validate the transactions, and process the transactions according to the merchant account. The payment processing system 140 may require the incoming transactions to be a certain format and contain certain data from the processor side merchant profile in order to identify, validate and process the transactions.

Regardless of the type of payment handler 120 used, in order for the electronic transactions to be processed the payment handler 120 needs to be configured in order to communicate with the payment processing system 140. The configuration of the payment handler 120 requires that a profile for the merchant (client side merchant profile) be programmed therein. The client side merchant profile may be similar to the processor side merchant profile and the two merchant profiles may contain at least a portion of the same data. The client side merchant profile may be substantially the same as the processor side merchant profile and the two merchant profiles may contain substantially the same data. The payment handler 120 may transmit various items from the client side merchant profile to the payment processing system 140 as part of electronic payment transaction.

The configuration of the payment handler 120 requires an understanding of the payment handler 120 and how to program it. The configuration of the payment handler 120 requires knowledge of the merchant account (e.g., allowable transactions), and the type and format of data that the payment processing center 140 requires. The configuration of the payment handler 120 requires coordination with the payment processor (payment processing system 140). The installation and configuration of the payment handler 120 is usually too complicated for the typical merchant. Accordingly, vendors are typically utilized to install and configure the payment handlers 120 for merchants. The vendors may coordinate with the payment processor in order gather the information necessary to configure the payment handler 120 (e.g., program the client side merchant profile therein). The delivery, installation, configuration and validation of the payment handler 120 is a significant cost factor in deploying a new merchant account.

Furthermore, if the merchant profile becomes corrupt the payment handler 120 may need to be reconfigured. Additionally, if attributes related to the merchant account change (e.g., allow additional transactions) the payment handler 120 may need to be reconfigured. Moreover, if the payment processing system 140 is modified (e.g., data required or format of data from payment handler 120 changes, payment processing center contact information (e.g., IP address) changes) the payment handler 120 may need to be reconfigured. The reconfiguration of the payment handler 120 may require the vendor to return for reconfiguration thereof, the payment handler 120 to be returned for reconfiguration, or replaced with a unit that has been reconfigured. Alternatively, the payment processor or the vendor may attempt to talk the merchant through the reconfiguration or may attempt to reconfigure the payment handler 120 remotely using a communication network. Regardless of the form of reconfiguration utilized, it may result in delays and additional costs.

Merchants, vendors or other parties that know how to configure a payment handler 120 can configure the devices to operate with other payment processing systems 140 and/or for other merchants. They may do this by programming a different merchant profile into the payment handler 120. This enables the same device to be reused by the same merchant for different merchant agreements or to be used by different merchants. The reprogramming of the payment handlers 120 creates an aftermarket for the devices that is out of the control of the payment processors or equipment manufactures. The aftermarket reduces the amount of payment handlers 120 required for new merchant accounts and thus reduces the profits the payment processors or equipment manufactures can make by charging for the devices as part of the merchant contract.

What is needed is a way to simplify and/or eliminate the configuration of the payment handlers 120 during initial setup and for reconfigurations required thereafter. What is also needed is a way to reduce or eliminate the reprogramming of payment handlers 120 so that the payment handlers 120 are controlled by the payment processors or the equipment manufacturer.

BRIEF DESCRIPTION OF THE DRAWINGS

The features and advantages of the various embodiments will become apparent from the following detailed description in which.

DETAILED DESCRIPTION

Figure 3:
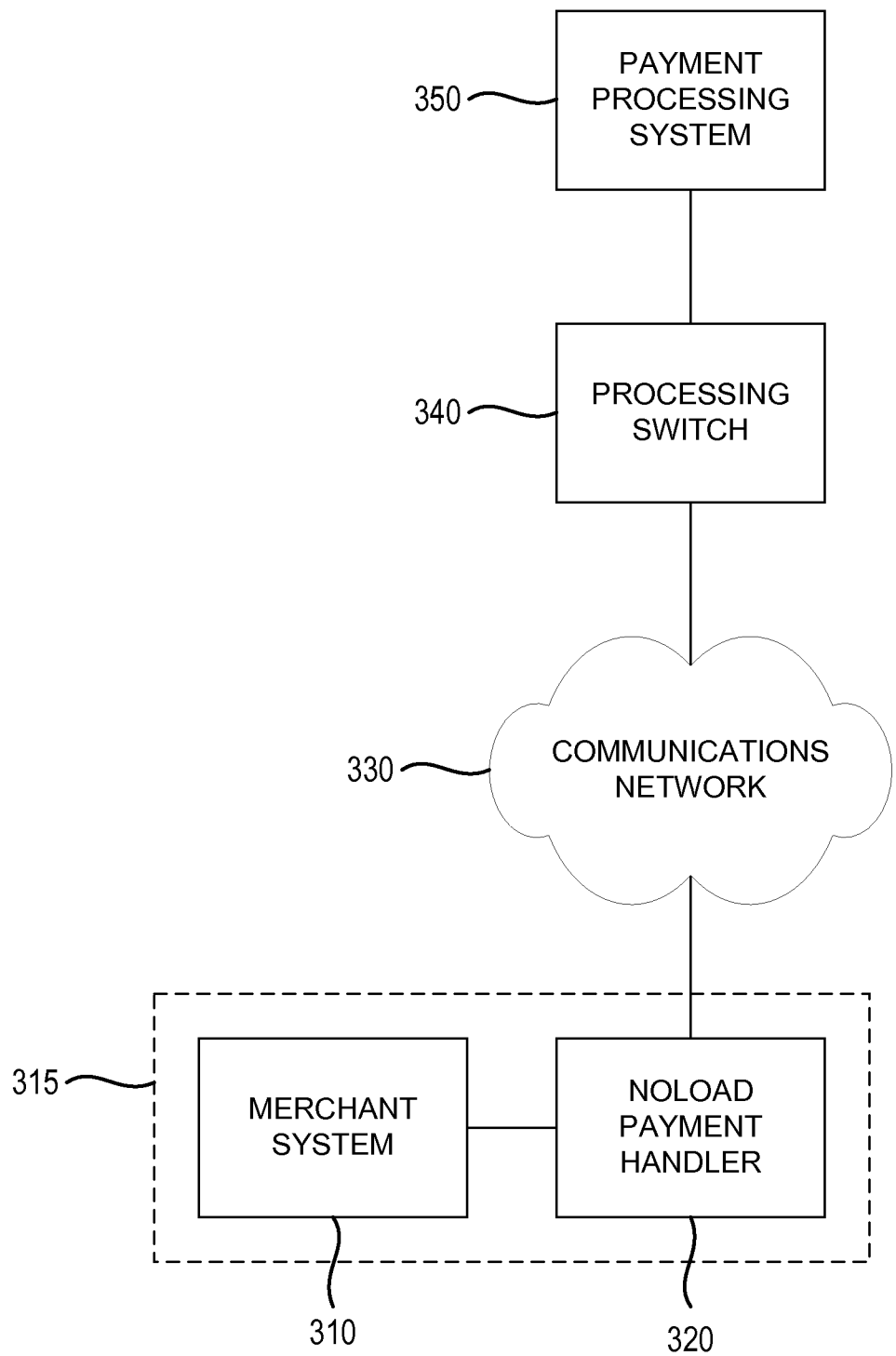
FIG. 3 illustrates an example architecture used to process electronic payments for merchant transactions, according to one embodiment.

FIG. 3 illustrates an example architecture used to process electronic payments for merchant transactions. The architecture includes a merchant system 310, a NoLoad payment handler 320, a communication network 330, a processing switch (reconfiguration server) 340, and a payment processing system 350. The merchant system 310 and the payment handler 320 are located at a merchant location 315. The merchant system 310, the payment handler 320, the communication network 330, and the payment processing system

Figure 1:
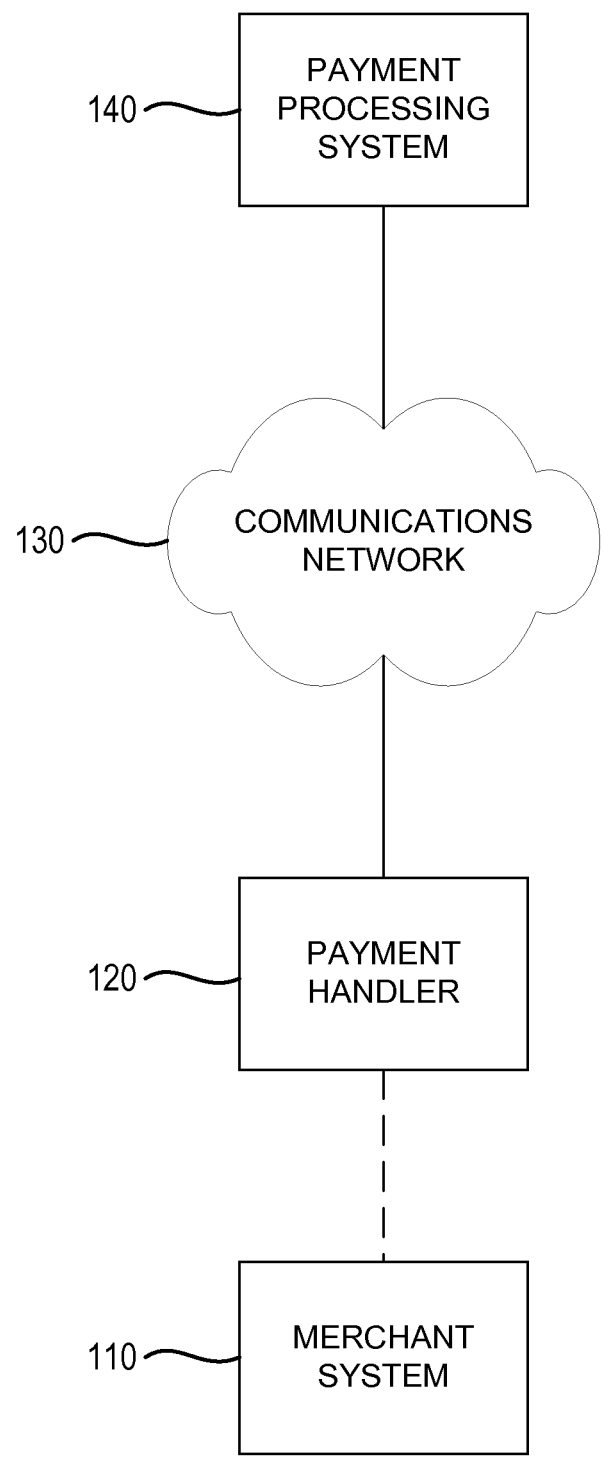
FIG. 1 illustrates an example architecture used to process electronic payments for merchant transactions, according to one embodiment.
Figure 2A:
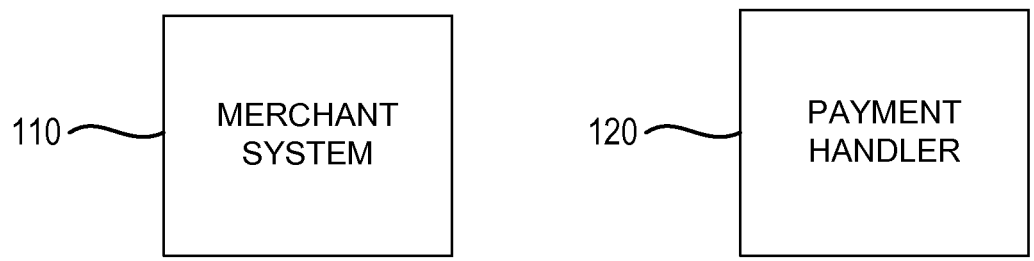
FIGS. 2A-2C illustrate several example merchant system-payment handler architectures, according to one embodiment.
Figure 2B:
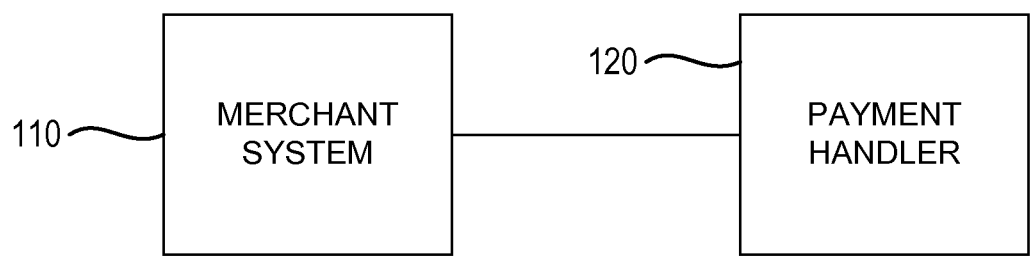
Figure 2C:
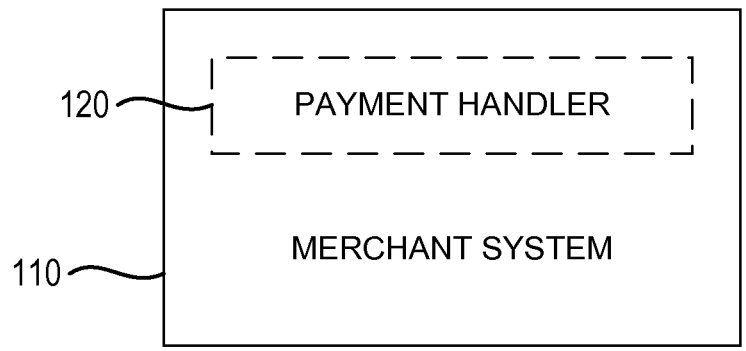

350 may be similar to those defined above with respect to FIGS. 1 and 2A-C. As illustrated, the merchant system 310 and the payment handler 320 are interfaced with one another (such as illustrated in FIG. 2B). However, the merchant system 310 and the payment handler 320 are not limited to being interfaced. For example, the merchant system 310 and the payment handler 320 could be separate devices (e.g., FIG. 2A) or could be one integrated device (e.g., FIG. 2C) without departing from the current scope.

The payment handler 320 is assigned a unique identification (e.g., serial number, device identification (DID)). The unique ID is programmed in the payment handler 320 as a permanent identification that may not be modified. The unique ID may be programmed into the payment handler 320 by a manufacturer when the payment handler 320 is produced. For a hardware payment handler 320 the unique ID may be programmed into non-volatile, non-programmable memory. For a software payment handler 320 the unique ID may be stored in the program. The unique ID may be presented on the payment handler 320 (e.g., with a label affixed thereto, engraved therein) so that the unique ID is known.

The payment handler 320 may receive transaction data (payment amount) and electronic payment information and process the information to create an electronic payment transaction. The payment handler 320 may add the unique ID in the electronic payment transactions. The unique ID may be embedded into the electronic payment transaction or may be included in header data for the electronic payment transaction message. The payment handler 320 includes the unique ID instead of information from the merchant profile. Accordingly, the payment handler 320 does not require programming/configuration of a client side merchant profile. Additionally, the payment handler 320 need not have memory for storing the client side merchant profile, though payment handlers 320 having memory and being capable of having a client side merchant profile programmed therein may be utilized.

The processing switch 340 may store client side merchant profiles for various merchant accounts (and associated merchants) and may associate the unique ID of the payment handler 320 used by the merchant with the merchant (and their client side merchant profile). The processing switch 340 may receive the electronic payment transactions from the payment handlers 320 having the unique ID included and may look up the unique ID and retrieve the associated client side merchant profile. The processing switch 340 may then reformat the electronic payment transaction in accordance with the client merchant profile and forward the reformatted electronic payment transaction to the payment processing system 350.

The use of a unique ID for the payment handler 320, and the correlation of the unique ID to the client side merchant profile in the processing switch 340 enables the configuration required to process electronic payments for a merchant to be moved upstream from the payment handler 320 to the processing switch 340. That is, the formatting of the electronic payment transaction required to be processed by the payment processing system 350 (e.g., inclusion of data from the client side merchant profile required) is performed by the processing switch 340 instead of the payment handler 320.

Hereinafter, the term merchant profile will be used to refer to parameters related to the merchant account. The term may be referring to the parameters stored in the payment processing system 350 (the processor side merchant profile) or may referring to the parameters stored in the processing switch 340 (the client side merchant profile).

The processing switch 340 may include one or more databases to maintain the merchant profiles and the unique IDs of the payment handlers 320 and the links therebetween, one or more servers to process the electronic payment transactions, and communication links to communicate with the payment handlers 320 and the payment processing system 350.

The payment processor may create the merchant profile in the processing switch 340. The payment processor may enter the merchant profile into the processing switch 340 via a webpage, a direct link, or other means or may upload the merchant profile into the processing switch 340. The payment processor may provide details related to the merchant profile to the operator of processing switch 340 and the operator may create the merchant profile in the processing switch 340. The unique ID of the payment handler 320 assigned to a merchant (and their merchant profile) may be provided to the processing switch 340 by the entity providing the payment handler 320 to the merchant. The unique ID of the payment handler 320 may be maintained as part of the merchant profile or may be associated with the merchant profiles (e.g., linked to an identification contained in the merchant profile). The unique ID may be entered and linked to the associated merchant profile by an operator of the processing switch 340. Alternatively, a party having access to the merchant account and the unique ID of the payment handler 320 provided to the merchant (e.g., equipment manufacturers, equipment distributors, installers, merchants) may enter the appropriate data into the processing switch 340 via a webpage, a direct link, or other means. The processing switch 340 may be maintained by the payment processor, equipment manufacturers, equipment distributors, or third parties.

Figure 4:
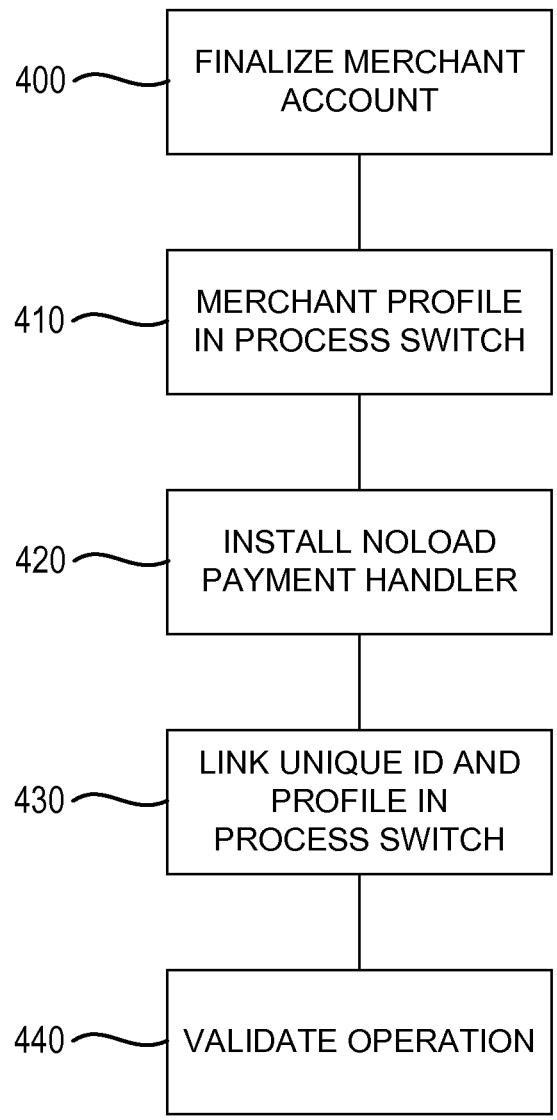
FIG. 4 illustrates an example process flow for configuring the example architecture of FIG. 3 to process electronic payment transactions, according to one embodiment.

FIG. 4 illustrates an example process flow for configuring the example architecture of FIG. 3 to process electronic payment transactions. Initially, a merchant account is finalized between a payment processor and a merchant 400. A merchant profile is created in the payment processing system that identifies the merchant and defines the parameters of the merchant account. A merchant profile may be created in the processing switch based on the parameters of the merchant account (the payment processor may directly create the merchant profile in the processing switch) 410. A payment handler is selected for and provided to the merchant based on at least the merchant system used and the communications platform used (e.g., dial, IP) 420. The payment handler may be provided to the merchant by, for example, the payment processor, equipment manufacturers, equipment distributors, or the operator of the processing switch. The payment handler may be sent to the merchant for self installation and configuration or may be delivered to the merchant by an installer that performs the installation and configuration.

The installation and configuration of the payment handler at the merchant location includes connecting the payment handler to the merchant system and the communications network used by the merchant. The connection between the payment handler and the merchant system may require a cable to be connected therebetween. The connection between the payment handler and the communications network may require a cable to be connected between the payment handler and a network interface device (e.g., phone jack, modem, router) providing connectivity to the communications network.

The unique ID of the payment handler is associated with the merchant profile in the processing switch 430. The association may be done prior to the payment handler being provided to the merchant or may be done once the payment handler is installed and configured at the merchant location.

Once the payment handler has been installed, the merchant or installer may contact the processing switch. The payment handler may have contact data (e.g., phone number, IP address) for the processing switch presented thereon (e.g., a label affixed thereto, engraved therein). The merchant or installer contact with the processing switch may be, for example, via a phone call to an operator, a voice activated system, or by logging into a website. In order to validate the communication the merchant or installer may need to provide identification information (e.g., merchant account identification, merchant identification) related to the merchant account.

If the unique ID of the payment handler was associated with the merchant (and merchant profile) prior to installation, the contact may not be required or may be to simply inform the processing switch that the payment handler has been installed (activate the merchant account) and/or to verify the unique ID of the payment handler installed matches the unique ID assigned to/associated with the merchant (and their merchant profile) in the processing switch.

If the unique ID of the payment handler was not associated with the merchant (and their merchant profile) prior to installation, the contact may be to associate the unique ID of the payment handler with the merchant (and their merchant profile) in the processing switch. The merchant or installer may provide identification information to the processing switch so that the merchant profile can be retrieved and then may provide the unique ID for the payment processor utilized by the merchant and associate the unique ID and the merchant profile with one another.

Once the association of the unique ID of the payment handler and the merchant (and their merchant profile) is complete, the merchant or installer may validate electronic payments can be processed for the merchant account 440. The validation may include processing a test transaction on the merchant system and paying for the transaction using a test electronic payment (e.g., credit card, gift card) to see if the transaction can be processed.

Figure 5:
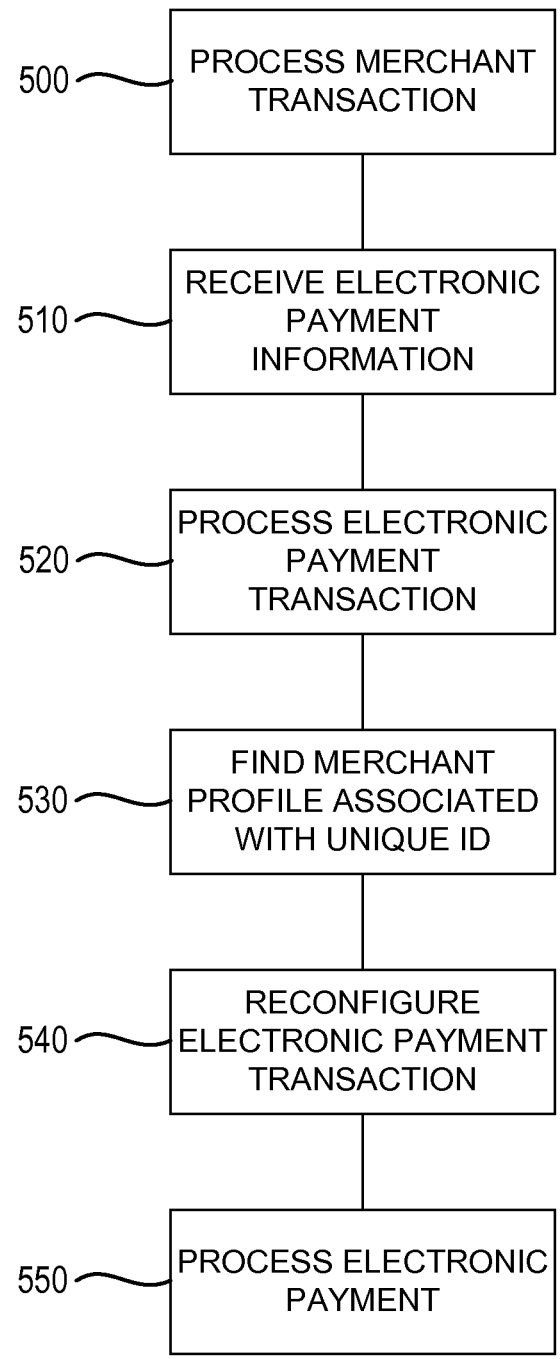
FIG. 5 illustrates an example process flow for processing electronic payment transactions using the example architecture of FIG. 3, according to one embodiment.

FIG. 5 illustrates an example process flow for processing electronic payment transactions using the example architecture of FIG. 3. Initially the merchant system processes a transaction for a customer 500. Electronic payment information (e.g., credit card number) is received from the customer to pay for the transaction 510. The transaction information (payment amount) and the electronic payment information are provided to the payment handler where the information is processed and the unique ID associated therewith is added to create an electronic payment transaction and the electronic payment transaction is forwarded to the processing switch 520. The payment handler may be configured to communicate with the processing switch.

The processing switch extracts the unique ID and looks up the merchant profile associated therewith 530. The processing switch then reformats the electronic payment transaction in accordance with the merchant profile 540. The reconfiguration includes removing the unique ID and adding the data that the payment processing system requires in order to validate and process the electronic payment. The reformatted electronic payment transaction is provided to the payment processing system where the electronic transactions are processed 550.

Referring back to FIG. 3, it should be noted that since the merchant profile is not programmed in the payment handler 320 the corruption of the merchant profile and the reconfiguration of the payment handler 320 is not a concern. Furthermore, if changes are made to the merchant account and accordingly the merchant profile in the payment processing system 350 the payment handler 320 need not be reconfigured. Rather, the changes to the merchant profile can be made in the processing switch 340. Additionally, if changes are made to the payment processing system 350 the processing switch 340 may capture the changes and the payment handler 320 need not require any modification.

In the event that the payment handler 320 needs to be replaced, the merchant may contact the processing switch 340 to have a new payment handler provided and may associate the new unique ID to the merchant profile so that no configuration is required of the new payment handler 320.

Since the payment handlers 320 do not have merchant profiles programmed therein they may not be reprogrammed in order to use them for a different merchant account or by a different merchant. Furthermore, in order for the payment handler 320 to be utilized the unique ID has to be associated with a merchant profile in the processing switch 340. This enables the use of the payment handlers 320 to be controlled. The control of the payment handlers 320 can enable the appropriate parties to only enable the payment handler 320 to be used if, for example, a rental fee is paid by the merchant.

The processing switch 340 and the payment processing system 350 may be operated by separate entities or may be operated by the same entity (payment processing company). If operated by the same entity, the processing switch 340 and the payment processing system 350 may be separate systems (devices), integrated systems (devices), or the same system (device). The processing switch 340 may be a front-end system for the payment processing system 350. If the payment processing system 350 was modified so that it did not require the merchant profile be included in electronic payment transactions but rather could process electronic payment transactions based on the unique ID and provided a means for associating unique IDs to merchant accounts, the processing switch 340 would not be required The processing switch 340 may communicate with multiple payment processing systems 350 and configure and forward the transaction data to the appropriate payment processing system 350 based on the merchant profile associated with the unique ID included in the electronic payment transactions received. The processing switch 340 may be updated by more than one payment processing system 350.

The processing switch 340 may be maintained and operated by a merchant. The processing switch 340 may receive electronic payment transactions from a plurality of payment handlers 320 associated with the merchant. The payment handlers 320 and the processing switch 340 may be contained in one location or may be distributed in various locations. The merchant may have one or more merchant profiles associated with their establishment and the unique IDs of the payment handlers 320 may be associated with the appropriate merchant profile. The processing switch 340 may reconfigure and forward each electronic payment transaction to a payment processing system 350 or may aggregate multiple electronic payment transactions (e.g., based on time, based on location, based on quantity) and reconfigure and forward the aggregated transactions.

Changes affecting multiple merchants (e.g., switching payment processing systems when a first company buys a second company and integrates the second companies merchants into the first companies system) can be made at the processing switch 340 (in one location) without the need to flow the data to the plurality of merchants (payment handlers 320).

Figure 6A:
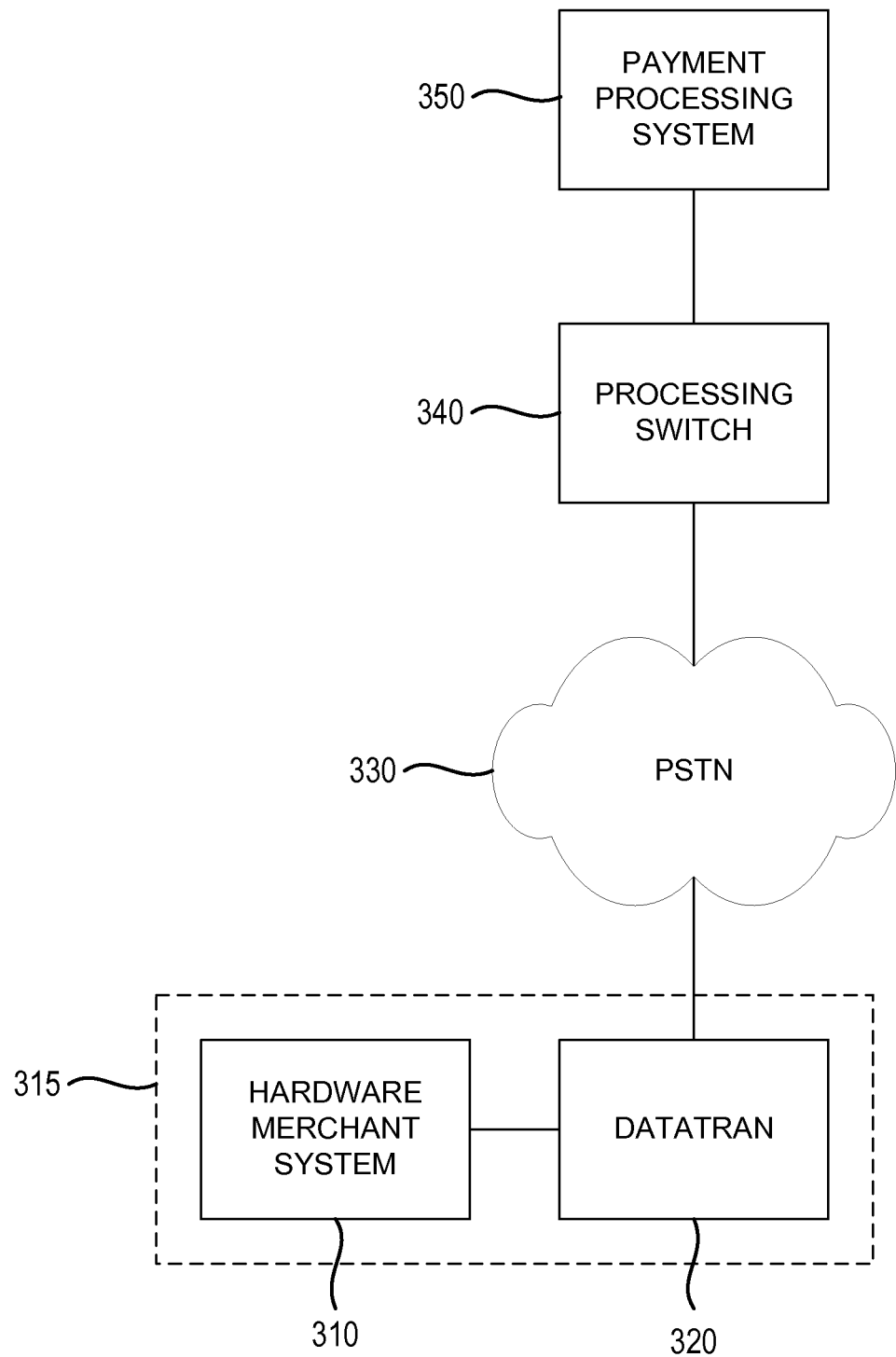
FIGS. 6A-D illustrate several example merchant system-hardware payment handler configurations for the example architecture of FIG. 3, according to one embodiment.

FIGS. 6A-D illustrate several example merchant system-hardware payment handler configurations for the example architecture of FIG. 3. FIG. 6A illustrates an example configuration where the communications network 330 utilized is the public switched telephone network (PSTN). The payment handler 320 (DataTran) may include a processor to process the transactions and a telephone modem (communication device) and a telephone jack (output interface) to transmit the transactions to the processing switch 340 over the PSTN 330. For ease of illustration, the processor, the modem, and the jack are not illustrated. A telephone cable may be used to connect the DataTran payment handler 320 to the PSTN 330. Alternatively the telephone modem may be separate from the DataTran 320 and connected thereto. As there are a plurality of different modems that utilize different operational parameters configuration problems may occur in this alternative embodiment. Accordingly, the DataTran 320 may be configured to work with a select number of modems and the system will only be guaranteed to work (avoid configuration problems) with one of the select modems.

Figure 6B:
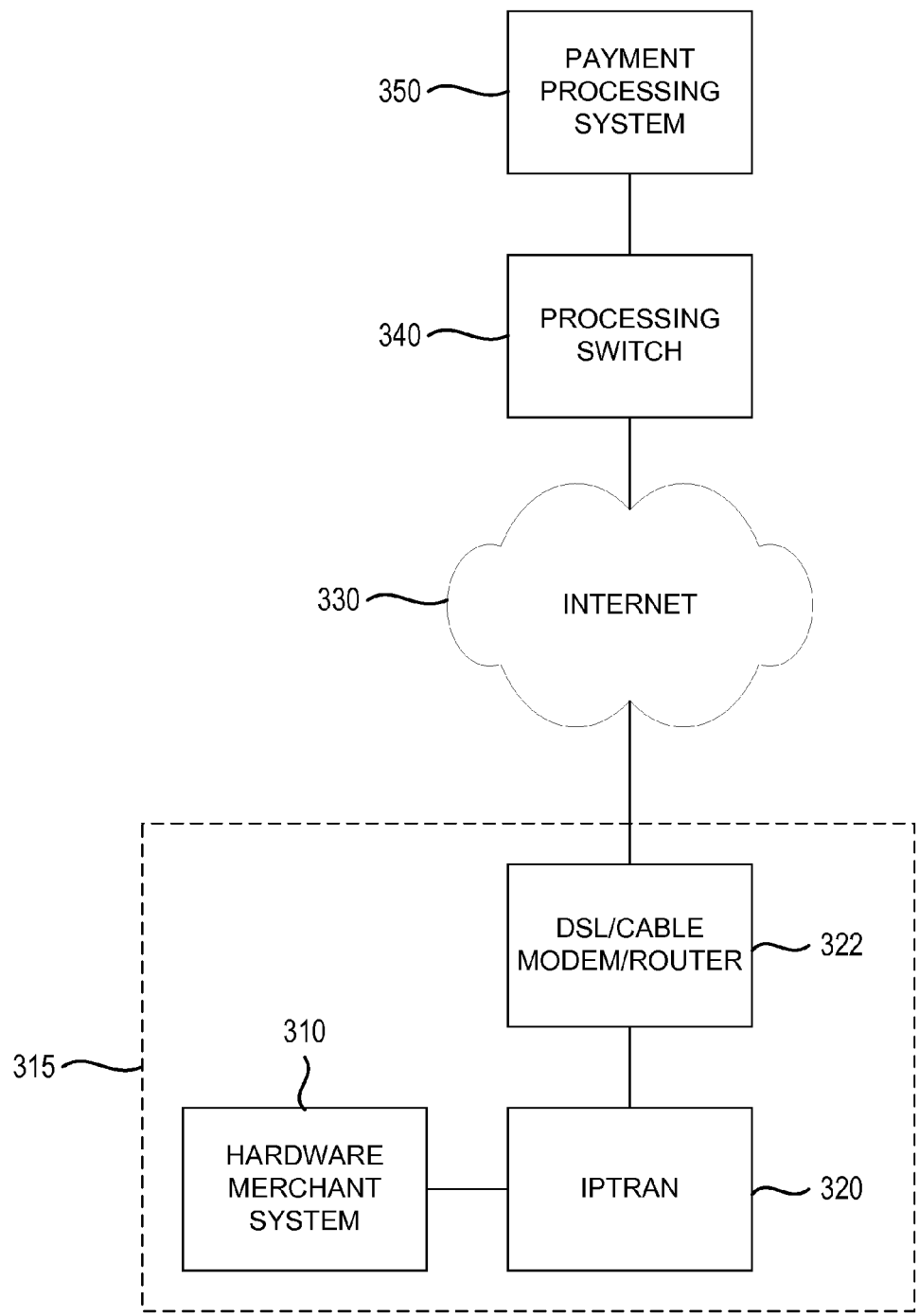

FIG. 6B illustrates an example configuration where the communications network 330 utilized is the Internet. The payment handler 320 (IPTran) may include a processor (not separately illustrated) to process the transactions and break the data into packets for transmission over the Internet 330. The IPTran payment handler 320 may be physically connected to a DSL data modem and/or router (DSL/Cable router/modem) 322 via an Ethernet cable or may have a wireless connection therebetween. The DSL/Cable router/modem 322 may provide connectivity to the Internet 330 via telephone or coaxial cable. As there are a plurality of different modems/routers 322 that utilize different operational parameters configuration problems may occur. Accordingly, the IPTran 320 may be configured to work with a select number of modems/routers for each type of Internet connection (e.g., DSL, cable) and the system will only be guaranteed to work (avoid configuration problems) with one of the select modems/routers. Alternatively, the DSL/cable router/modem 322 may be included within the IPTran 320. A DSL IPTran may include a DSL modem/router and a cable IPTran may include a cable modem router.

Figure 6C:
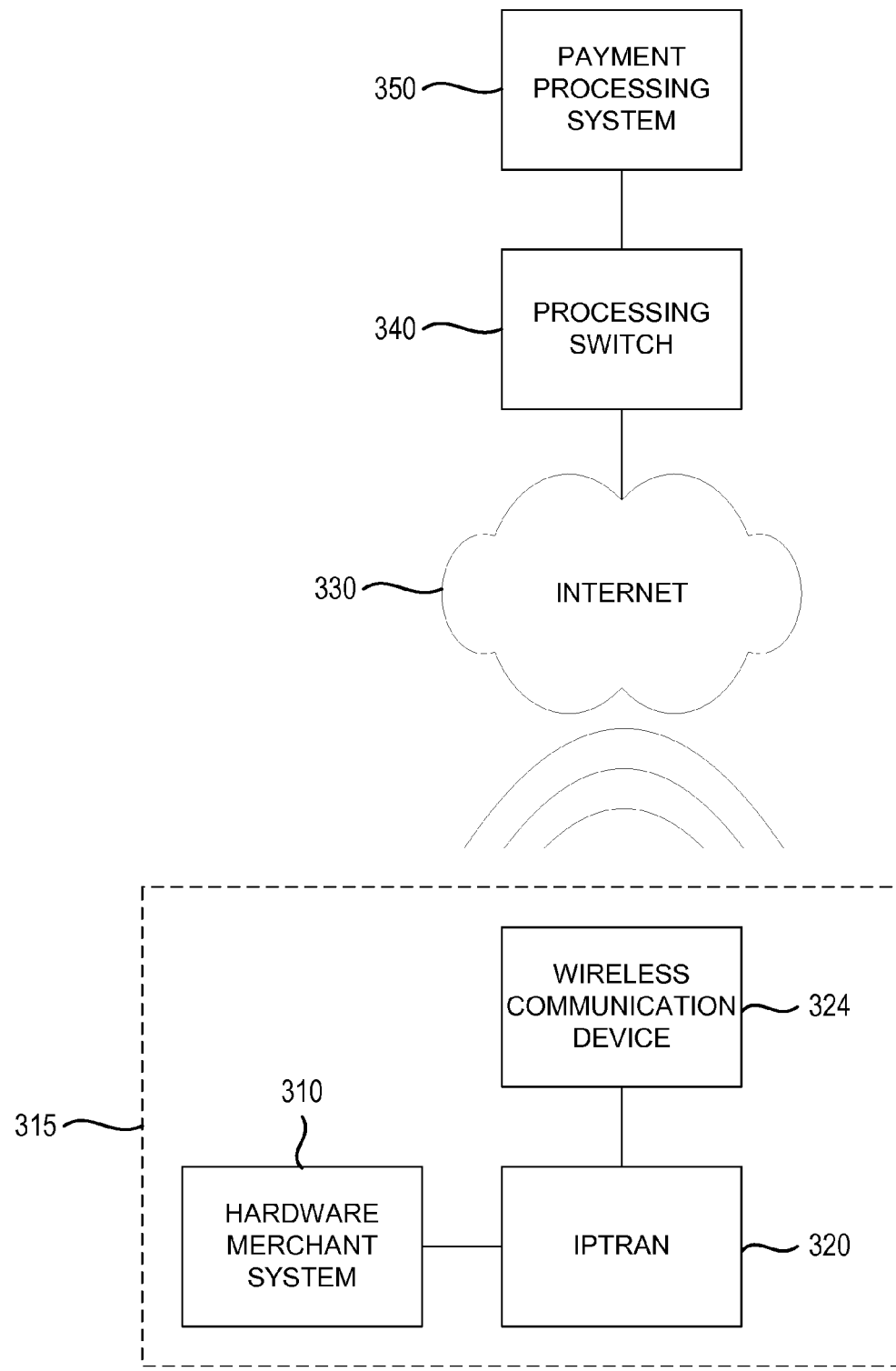

FIG. 6C illustrates an example configuration where the communications network 330 utilized is the Internet. A wireless communication device 324 (e.g., wireless network card) is used to provide wireless connectivity between the IPTran 320 and the Internet 330. Using a wireless network may be beneficial for mobile merchant systems or systems located where it may be difficult or costly to run wired telephone or Internet lines. As there are a plurality of different wireless communication devices that utilize different operational parameters configuration problems may occur. Accordingly, the IPTran 320 may be configured to work with a select number of wireless communication devices and the system will only be guaranteed to work (avoid configuration problems) with one of the select ones. Alternatively the wireless communication device 324 may be within the IPTran 320.

The merchant may desire to utilize more than one communication network for processing electronic payments (e.g., redundant networks for fallback processing). For example, the merchant may utilize the Internet as their primary communications network and the PSTN as their redundant network if Internet connection is lost. The merchant may desire to connect to the communications network in more than one fashion (e.g., wired and wireless). For example, if the merchant moves the merchant system 310 to a remote location they may switch from connecting to the Internet via a DSL/cable modem/router to a wireless connection. The merchant could utilize multiple payment handlers 320 to enable communications over multiple communication networks (e.g., PSTN, Internet) or to provide multiple connections (e.g., wired, wireless) to the communications network. For example the merchant may have an IPTran for Internet communications and DataTran for PSTN communications.

Preferably, the payment handler 320 may be capable of utilizing more than one communication network 330 or more than one connection to process electronic payment transactions. The payment handler 320 may automatically switch from communicating over the primary communication network to the secondary network if there is a problem/failure with the primary network. The payment handler 320 may also permit the merchant to selectively switch between which communication network is utilized or between how the connection to the communication network is established.

Figure 6D:
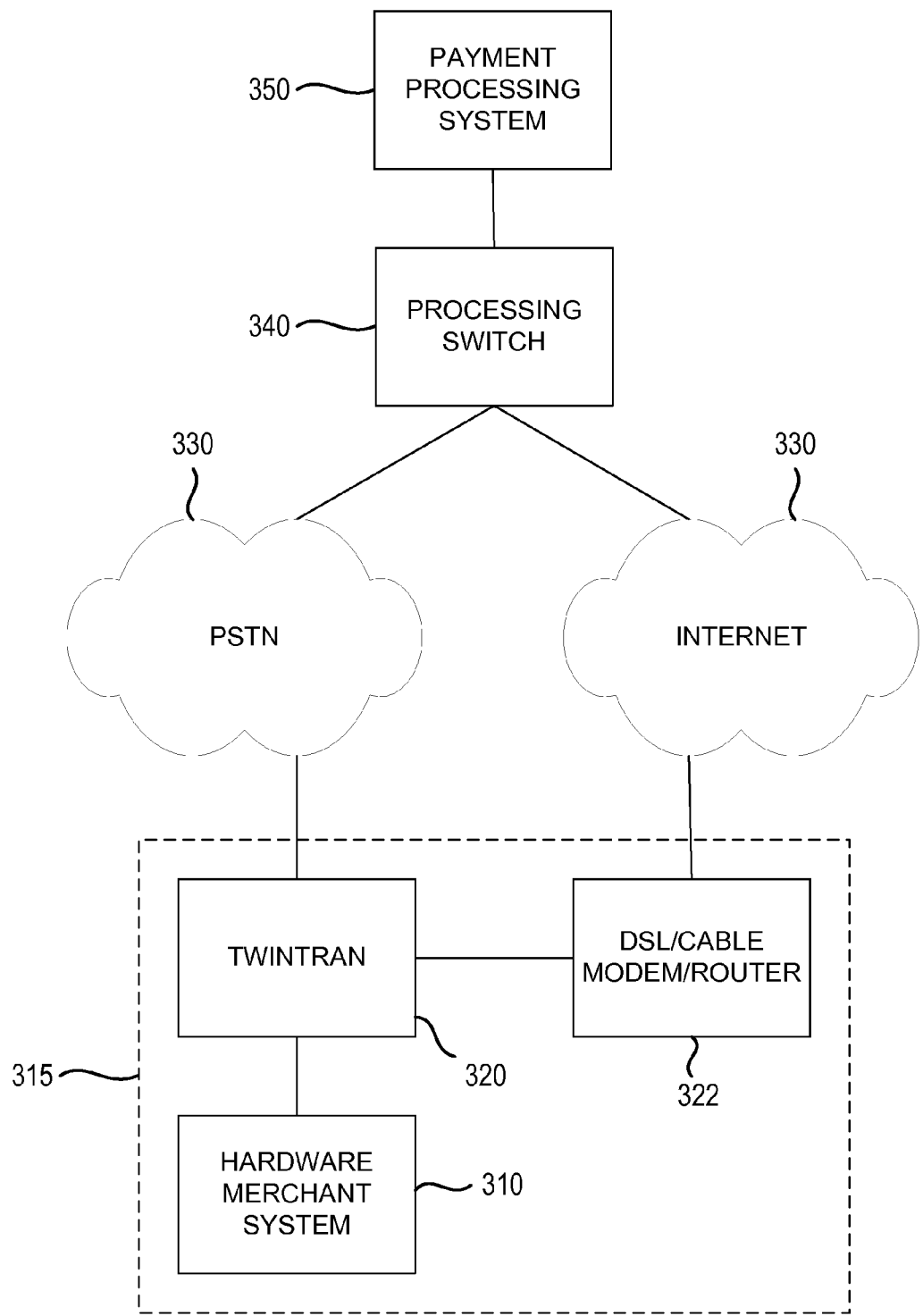

FIG. 6D illustrates an example configuration where the primary communications network 330 utilized is the Internet with the PSTN as the fallback. The payment handler 320 may be a combination of a dial link modem and an IPTran with functionality for automatically switching upon an error in the IPTran or the Internet connection or to allow manual switchover (TwinTran).

Figure 7A:
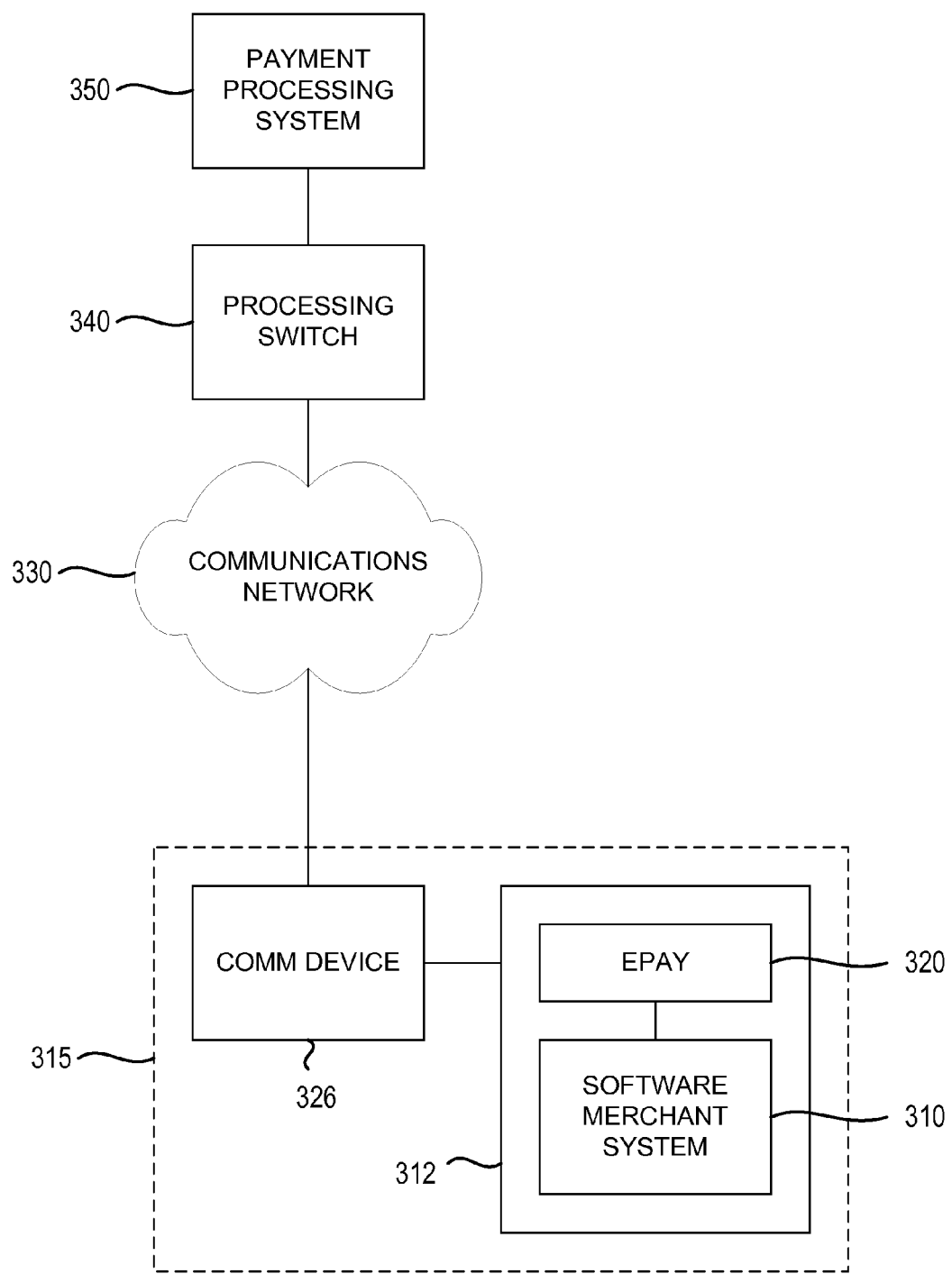
FIGS. 7A-B illustrate several example software merchant system-software payment handler configurations for the example architecture of FIG. 3, according to one embodiment.
Figure 7B:
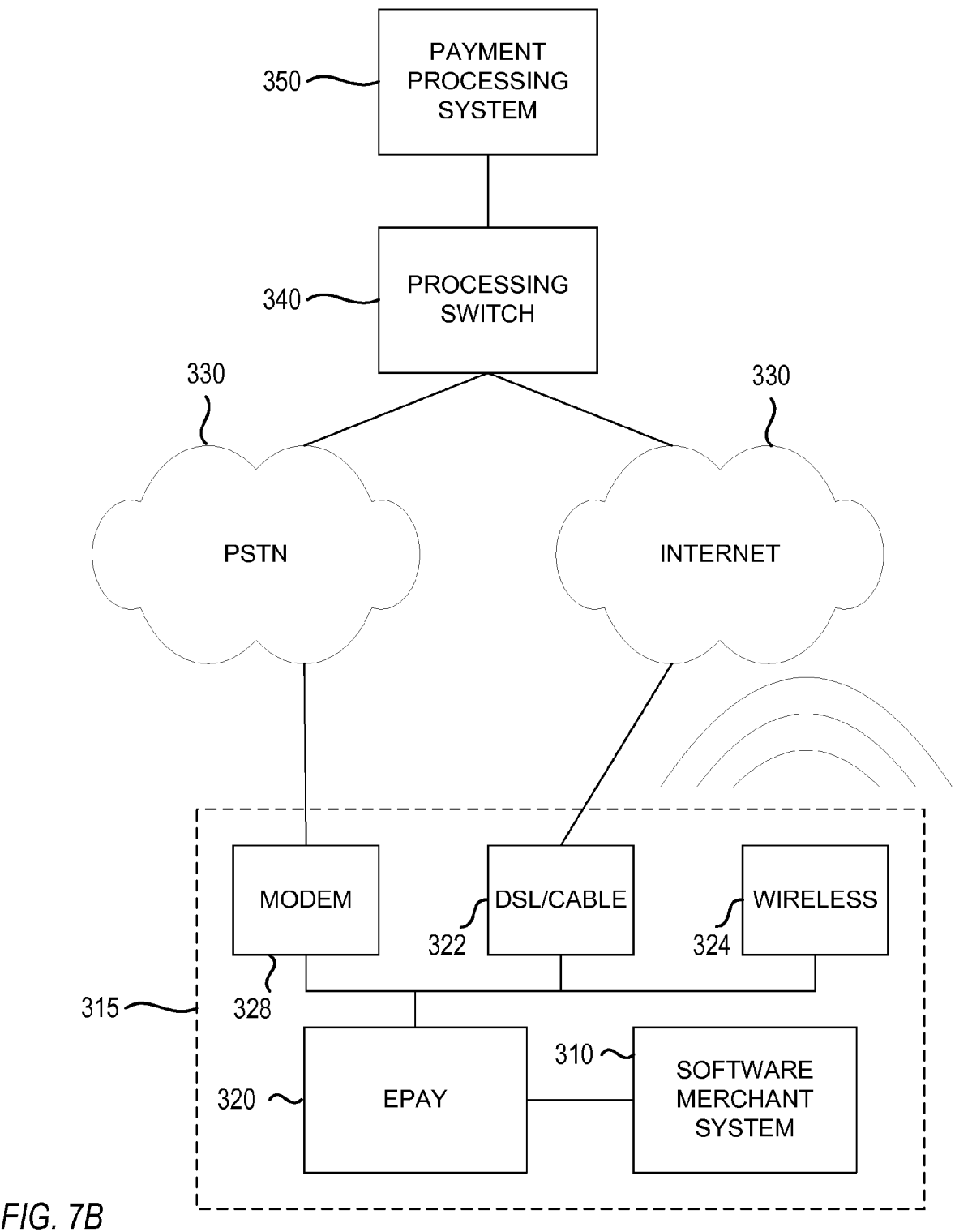

FIGS. 7A-B illustrate several example software merchant system-software payment handler configurations for the example architecture of FIG. 3. FIG. 7A illustrates an example configuration where the software merchant system 310 (e.g., point of sale (POS) application) and the software payment handler 320 (ePay) are running and interfaced together on the same device (e.g., computer) 312. The unique ID used to identify the ePay 320 may be a serial number associated with the ePay 320 or may be a MAC ID associated with the device 312 the software is running on. The merchant system 310 and the ePay 320 are not limited to running on the same device. Rather, the merchant system 310 and the ePay 320 could be run on separate devices capable of communicating with one another without departing from the current scope. In fact, several merchant systems 310 could be networked to a single ePay 320.

The ePay 320 may configure the data for processing by the processor switch 340. The device 312 may be connected to a communication device (e.g., modem, DSL/Cable router/modem, wireless network card) 326 for providing connectivity to the communication network 330 (e.g., PSTN, Internet). The device 312 may be wired to the communication device 326 (e.g., via an Ethernet cable) or may have a wireless connection therebetween. Alternatively, the communication device 326 may be included within the device 312.

Like the hardware merchant system it is possible for the software merchant system to have redundant paths to communicate with the processor switch 340. For example, if the device 312 has multiple communication devices available to it, redundant communication paths can exist between the ePay 320 and the payment processing center 350.

FIG. 7B illustrates an example configuration having a modem 328 to communicate with the PSTN 330, and a DSL/Cable router/modem 322 and a wireless network card 324 to communicate with the Internet 330. The merchant system 310 and the ePay 320 may be loaded on the same device or different devices. The modem 328, the DSL/Cable router/modem 322 and/or the wireless network card 324 may be contained within the device having the ePay 320 loaded thereon or on separate devices or may be standalone devices.

Figure 8:
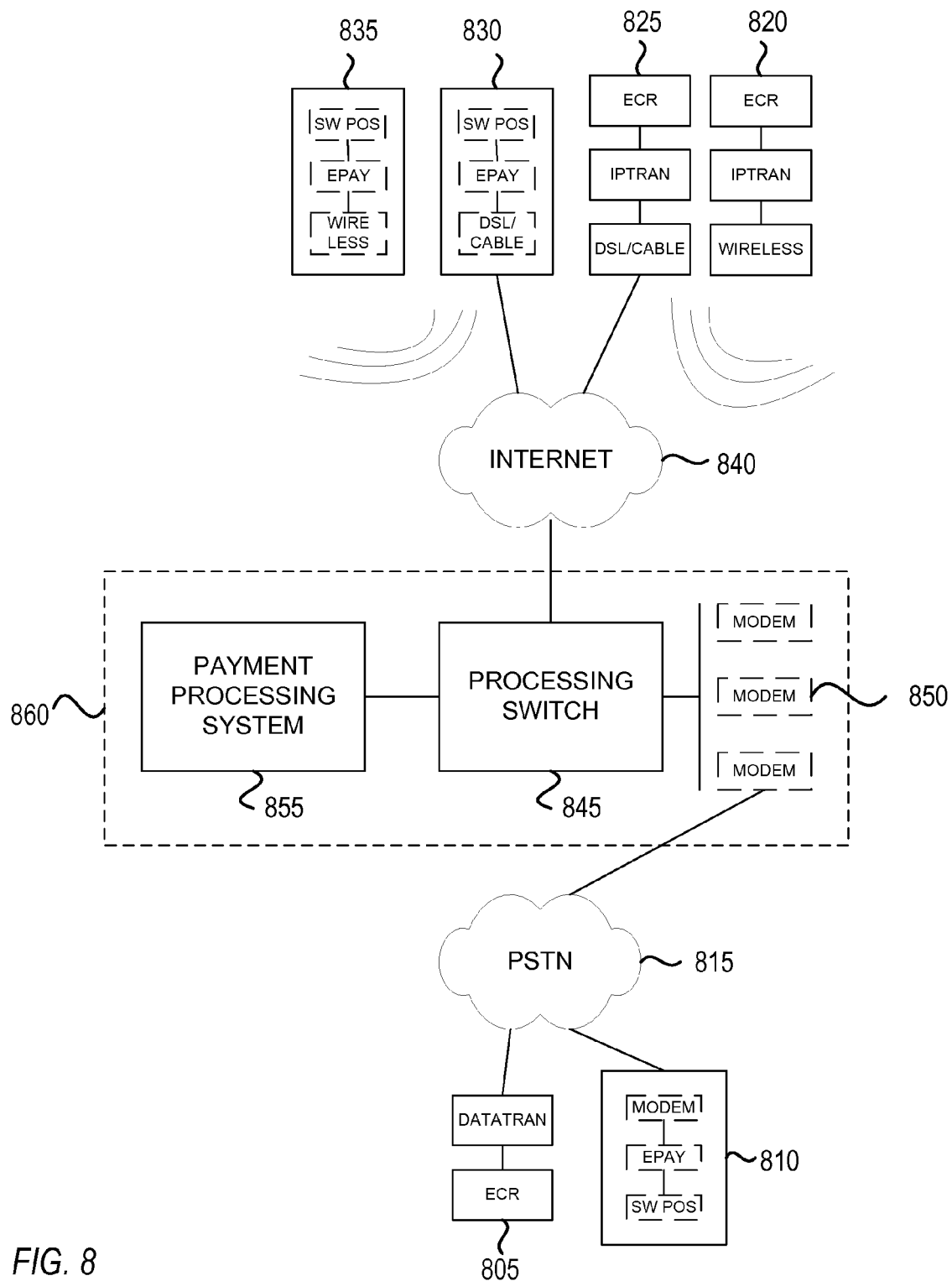
FIG. 8 illustrates an example system for processing electronic transactions from multiple merchants, according to one embodiment.

FIG. 8 illustrates an example system for processing electronic payment transactions from multiple merchants. The system may include merchants utilizing hardware systems 805 and software systems 810 utilizing the PSTN 815 as the communications network and hardware systems 820, 825 and software systems 830, 835 utilizing the Internet 840 as the communications network. The payment handlers for the various merchant systems 805, 810, 820, 825, 830, 835 are defined by unique IDs that are embedded in electronic payment transactions forwarded to a processing switch 845 via the respective communication network 815, 840. Banks of modems 850 receive the transactions from the PSTN 815. The processing switch 845 extracts the unique IDs from the received transactions, looks up the merchant profile for the unique IDs, reconfigures the electronic payment transactions based on the merchant profile, and forwards the reconfigured transactions to a payment processing system 855. The processing switch 845 and the payment processing system 855 may be maintained by one entity 860 (e.g., payment processor).

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

An embodiment may be implemented by hardware, software, firmware, microcode, or any combination thereof. When implemented in software, firmware, or microcode, the elements of an embodiment are the program code or code segments to perform the necessary tasks. The code may be the actual code that carries out the operations, or code that emulates or simulates the operations. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The program or code segments may be stored in a processor readable medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor/machine readable/accessible medium include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air, electromagnetic, RF links, etc.

The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The term "data" here refers to any type of information that is encoded for machine-readable purposes. Therefore, it may include program, code, data, file, etc.

All or part of an embodiment may be implemented by software. The software may have several modules coupled to one another. A software module is coupled to another module to receive variables, parameters, arguments, pointers, etc. and/or to generate or pass results, updated variables, pointers, etc. A software module may also be a software driver or interface to interact with the operating system running on the platform. A software module may also be a hardware driver to configure, set up, initialize, send and receive data to and from a hardware device.

An embodiment may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

The various embodiments are intended to be protected broadly within the spirit and scope of the appended claims.

What is claimed:

1. A system for preparing electronic payments received by a merchant for processing, the system comprising:
    a payment handler device located at a merchant location, wherein the payment handler device does not include any merchant profile information stored therein and does not require any programming specific to the merchant, the payment handler device including:
        a first communication interface to receive transaction information related to a sale transaction between the merchant and a consumer where the consumer is paying via an electronic payment, wherein the transaction information includes a transaction price and electronic payment information for the consumer;
        a second communication interface to a communications network;
        non-volatile non-programmable memory containing a unique device identification, wherein the unique device identification is written to the memory during manufacture and can not be modified thereafter;
        a processor; and
        a processor-accessible storage medium to store processor executable instructions, which, when executed by the processor causes the processor to:
            receive the transaction information via the first communication interface,
            retrieve the unique device identification from the non-volatile non-programmable memory,
            generate an electronic payment transaction message, wherein the electronic payment transaction message includes at least a portion of the transaction information and the unique device identification and does not include any merchant profile information; and
            transmit via the second communication interface the electronic payment transaction message; and
    a processing switch including:
        a communication interface to provide external communications;
        a database to store information for a plurality of merchant accounts, wherein the information stored for each merchant account includes merchant profile information and the unique device identification for the payment handler device utilized by the merchant;
        a computer-accessible storage medium to store computer executable instructions, which, when executed by a computer causes the computer to:
            receive via the communication interface the electronic payment transaction message from the payment handler device, retrieve from the database the associated merchant profile information for the unique device identification included in the electronic payment transaction message; and reconfigure the electronic payment transaction message based on the merchant profile information, wherein the reconfigured electronic payment message includes at least a portion of the merchant profile information.

2. The system of claim 1, wherein when executed by the computer the computer executable instructions further cause the computer to transmit the reconfigured electronic payment message to an electronic payment processing system for processing of the electronic payments.

3. The system of claim 1, further comprising an electronic payment processing system to process the electronic payments.

4. The system of claim 3, wherein the processing switch and the electronic payment processing system are operated by same entity.

5. The system of claim 1, wherein the first communication interface includes a connection to a merchant point of sale system.

6. The system of claim 1, wherein the first communication interface includes a user interface for the merchant to enter at least some subset of the transaction information.

7. The system of claim 1, wherein the first communication interface includes a connection to an electronic payment reader.

8. The system of claim 1, wherein the communication network is a telephone network.

9. The system of claim 1, wherein the communication network is the Internet.

10. A payment handler device located at a merchant location to generate an electronic payment transaction message for processing of an electronic payment received by a merchant, wherein the payment handler device does not include any merchant profile information stored therein and does not require any programming specific to the merchant, and wherein the payment handler device includes:

a first communication interface to receive transaction information related to a sale transaction between the merchant and a consumer where the consumer is paying via an electronic payment, wherein the transaction information includes a transaction price and electronic payment information for the consumer;

a second communication interface to provide external communications;

non-volatile non-programmable memory containing a unique device identification, wherein the unique device identification is written to the memory during manufacture and can not be modified thereafter;

a processor; and a processor-accessible storage medium to store processor executable instructions, which, when executed by the processor causes the processor to:

receive the transaction information via the first interface, retrieve the unique device identification from the memory, generate the electronic payment transaction message, wherein the electronic payment transaction message includes at least a portion of the transaction information and the unique device identification and does not include any merchant profile information; and transmit via the second interface the electronic payment transaction message to a processing switch, wherein the processing switch will match the electronic payment transaction message to the merchant based on the unique device identification.

11. The payment handler device of claim 10, wherein the first communication interface includes a connection to a merchant point of sale system.

12. The payment handler device of claim 10, wherein the first communication interface includes a user interface for the merchant to enter the transaction information.

13. The payment handler device of claim 10, wherein the first communication interface includes a connection to an electronic payment reader.

14. The payment handler device of claim 10, wherein the second communication interface includes a connection to a communication network.

15. The payment handler device of claim 14, wherein the communication network is a telephone network.

16. The payment handler device of claim 14, wherein the communication network is the Internet.

17. A processing switch to associate electronic payment transaction messages received that do not include any merchant profile information to merchant accounts and to reconfigure the electronic payment transaction messages for the associated merchant accounts, wherein the processing switch includes a communication interface to provide external communications;

a database to store information for a plurality of merchant accounts, wherein the information stored for each merchant account includes merchant profile information and a unique device identification for a payment handler device utilized by the merchant to create the electronic payment transaction messages, wherein the unique device identification is written to the payment handler device during manufacture and can not be modified thereafter, and wherein the payment handler device does not include any merchant profile information stored therein and does not require any programming specific to the merchant; and a computer-accessible storage medium to store computer executable instructions, which, when executed by a computer causes the computer to:

receive via the interface the electronic payment transaction message from the payment handler device, retrieve the associated merchant profile information for the unique device identification included in the electronic payment transaction message; and reconfigure the electronic payment transaction message based on the merchant profile information, wherein the reconfigured electronic payment message includes at least a portion of the merchant profile information.

18. The processing switch of claim 17, wherein when executed by the computer the computer executable instructions further cause the computer to transmit the reconfigured electronic payment message to an electronic payment processing system for processing of electronic payments for the merchant.

19. The processing switch of claim 17, wherein the communication interface includes a connection to a communication network.

20. The processing switch of claim 19, wherein the communication network is a telephone network.

21. The processing switch of claim 19, wherein the communication network is the Internet.

22. The processing switch of claim 17, wherein when executed by the computer the computer executable instructions further cause the computer to control use of the payment handler devices.

23. The processing switch of claim 17, wherein when executed by the computer the computer executable instructions further cause the computer to reject the electronic payment transaction message if the unique identification included therein is not associated with a merchant.

* * * * *